United States Patent [19]

Hirano et al.

[11] Patent Number: 5,283,459
[45] Date of Patent: Feb. 1, 1994

[54] SEMICONDUCTOR SENSOR INCLUDING AN APERTURE HAVING A FUNNEL SHAPED SECTION INTERSECTING A SECOND SECTION

[75] Inventors: Hirokazu Hirano, Oomiya; Bunshiro Yamaki, Fujisawa, both of Japan

[73] Assignee: Kabushiki Kaisha Toshiba, Kawasaki, Japan

[21] Appl. No.: 812,848

[22] Filed: Dec. 20, 1991

Related U.S. Application Data

[63] Continuation of Ser. No. 612,849, Nov. 14, 1990, abandoned.

[30] Foreign Application Priority Data

Nov. 15, 1989 [JP] Japan ............... 1-296728

[51] Int. Cl.$^5$ ............... H01L 29/66; H01L 29/96; H01L 29/84
[52] U.S. Cl. ............... 257/419; 257/254; 257/414; 257/415; 257/417; 257/418
[58] Field of Search ............... 357/26; 257/414, 415, 257/417, 418, 419, 254

[56] References Cited

U.S. PATENT DOCUMENTS

| | | |
|---|---|---|
| 3,888,703 | 6/1975 | Wise et al. |
| 4,908,693 | 3/1990 | Nishiguchi ............... 357/26 |
| 4,975,390 | 12/1990 | Fujii et al. ............... 357/26 |
| 5,006,487 | 4/1991 | Stokes ............... 357/26 |

FOREIGN PATENT DOCUMENTS

0178662 4/1986 European Pat. Off. .
1-239882 9/1989 Japan ............... 357/26

OTHER PUBLICATIONS

IBM Technical Disclosure Bulletin, vol. 25, No. 10, dated Mar. 1983, pp. 5041-5042 by J. L. Speidell.

*Primary Examiner*—Andrew J. James
*Assistant Examiner*—Carl Whitehead, Jr.
*Attorney, Agent, or Firm*—Finnegan, Henderson Farabow, Garrett & Dunner

[57] ABSTRACT

A semiconductor sensor with a compact structure is provided, which comprises a semiconductor substrate, a semiconductor diaphragm integrally formed with the semiconductor substrate, and a penetrating aperture formed in the semiconductor substrate so as to surround desired sides of the diaphragm. The aperture has first and second funnel-shaped aperatures whose intersecting conic sections open toward opposite directions. A cavity for defining the diaphragm is provided when the semiconductor substrate is subjected to electrolytic etching to form the second funnel-shaped aperture therein.

8 Claims, 5 Drawing Sheets

SEMICONDUCTOR SENSOR INCLUDING AN APERTURE HAVING A FUNNEL SHAPED SECTION INTERSECTING A SECOND SECTION

This application is a continuation of application Ser. No. 07/612,849 filed Nov. 14, 1990, abandoned.

BACKGROUND OF THE INVENTION

1. Field of the Invention

The present invention relates to a semiconductor sensor such as semiconductor acceleration sensors, semiconductor flow sensors and semiconductor micro-valves, and a method of making the same.

2. Description of the Related Art

In semiconductor sensors such as semiconductor acceleration sensors, semiconductor flow sensors and semiconductor micro-valves, a silicon semiconductor substrate is selectively etched to provide a thin portion or a penetrating aperture therein. As a technique of etching such a silicon semiconductor substrate, there has been employed an electrolytic etching method using caustic potash, which utilizes a difference in electrolytic potentials due to the conductivity types of the semiconductor substrate. FIG. 1 shows etching characteristics obtained when N-type and P-type silicon semiconductor substrates having a (100) plane are electrolytically etched using the caustic potash. In FIG. 1, the ordinate indicates the electric current, and the abscissa the voltage, respectively. As is apparent from FIG. 1, in the case of the N-type semiconductor, the etching proceeds until the voltage reaches about 2 V. When the voltage exceeds 2 V, the etching is stopped. On the other hand, in the case of the P-type semiconductor, the etching proceeds until the voltage rises to about 4 V, but the etching stops when the voltage exceeds 4 V. Thus, if the voltage is set at 3 V, the N-type semiconductor is not etched, while the P-type semiconductor is etched.

By means of this anisotropic etching, the thin portion or penetrating aperture is formed in the silicon semiconductor substrate, thus providing a semiconductor sensor. FIG. 2 shows a structure of a conventional semiconductor acceleration sensor, which comprises a P-type silicon semiconductor substrate 11, an N-type semiconductor region 13 serving as a thin portion (diaphragm) and formed in a major surface of the P-type semiconductor substrate 11, a P-type semiconductor region 14 serving as a resistor and formed in the N-type semiconductor region 13, an electrode wiring layer 15 formed on the P-type semiconductor region 14 through an insulating layer 12, a funnel-shaped cavity 16 made from the bottom surface of the semiconductor substrate 11 to form the thin portion, and a funnel-shaped aperture 17 penetrating in the thickness direction of the substrate 11 so as to surround both side surfaces of the thin portion.

The funnel-shaped aperture 17 is formed by etching the bottom surface of the semiconductor substrate 11 so as to penetrate the substrate 11. The angle between the bottom surface of the semiconductor substrate 11 and the wall defining the aperture 17 is about 60°. Thus, as is shown in FIG. 3, when the thickness of the semiconductor substrate 11 is given by h, the diameter of the funnel-shaped aperture 17 becomes 1.2 h. As a result, it is not possible to reduce the size of the semiconductor sensor.

SUMMARY OF THE INVENTION

It is, therefore, an object of the present invention to provide a semiconductor sensor for eliminating the disadvantage of the prior art.

Another object of the present invention is to provide a method of making a semiconductor sensor, wherein a funnel-shaped penetrating aperture and a diaphragm are simultaneously formed.

According to an aspect of the present invention, there is provided a semiconductor sensor with a compact structure, which comprises a semiconductor substrate, a semiconductor diaphragm integrally formed with the semiconductor substrate, and a penetrating aperture formed in the semiconductor substrate so as to surround desired sides of the diaphragm. The aperture has a first funnel-shaped aperture and a second aperture joined to the first funnel-shaped aperture. A cavity for defining the diaphragm is provided when the semiconductor substrate is subjected to electrolytic etching to form the second funnel-shaped aperture therein.

According to another aspect of the present invention, there is provided a method of making the semiconductor sensor according to the design incorporated in the first aspect of the present invention.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

DETAILED DESCRIPTION OF THE PREFERRED EMBODIMENT

Figure 4:
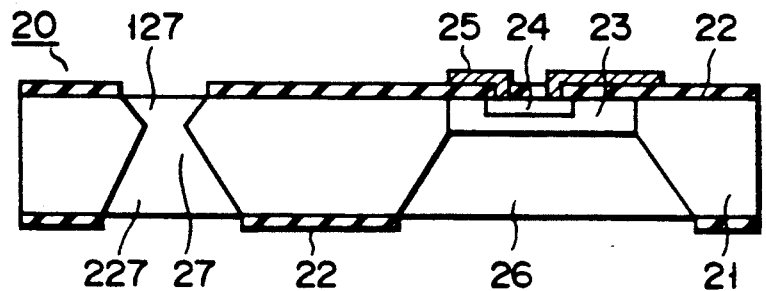
FIG. 4 is an enlarged cross-sectional view showing a semiconductor acceleration sensor according to an embodiment of the present invention.
Figure 5:
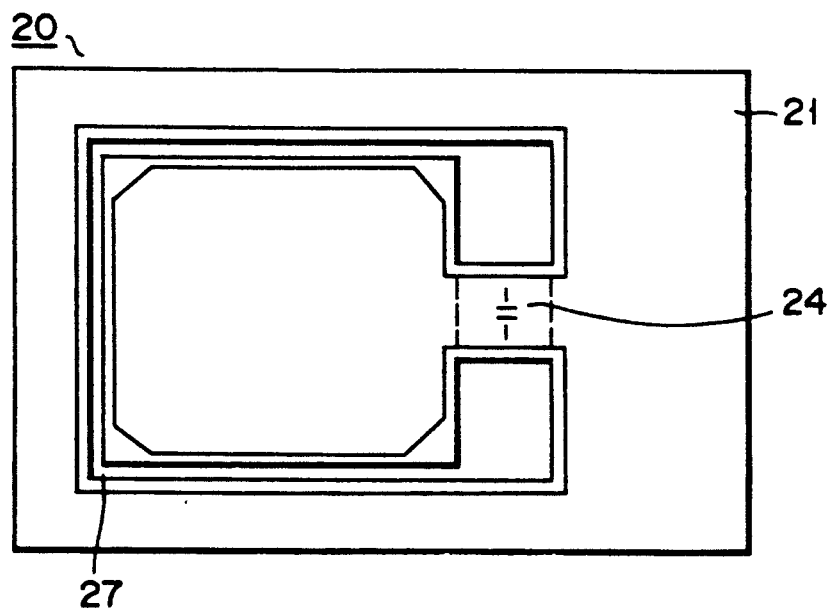
FIG. 5 is a plane view of the semiconductor acceleration sensor.

A semiconductor acceleration sensor according to an embodiment of the present invention will now be described with reference to FIGS. 4 and 5.

A semiconductor acceleration sensor 20 includes a P-type silicon semiconductor substrate 21, an N-type semiconductor region 23 serving as a thin portion (diaphragm) in a major surface of the P-type semiconductor substrate 21, P-type semiconductor regions 24 in the N-type semiconductor region 23 and serving as resistor layers, electrode wiring layers 25 above the P-type semiconductor regions 24 through an insulating layer 22, and a funnel-shaped cavity 26 integrally connected with the bottom surface of the semiconductor substrate 21 and defining the thin portion. A funnel-shaped aperture 27 penetrating the substrate 21 in the thickness direction so as to surround the thin portion includes an upper aperture 127 formed from the top surface of the semiconductor substrate 21 and a lower aperture 227 formed from the bottom surface of the substrate 21. As is shown in FIG. 5, in the semiconductor acceleration sensor 20, four P-type semiconductor regions 24 serving as resistor layers are provided in the N-type semiconductor region 23 serving as the diaphragm in order to provide a bridge circuit. Though not shown, bonding pads are formed at an end portion of the semiconductor substrate 21. The bonding pads are connected to end portions of the resistor layers 24 through the electrode wiring layers 25.

A method of making the semiconductor acceleration layer 20 will now be described with reference to FIGS. 6A to 6D.

Figure 6A:
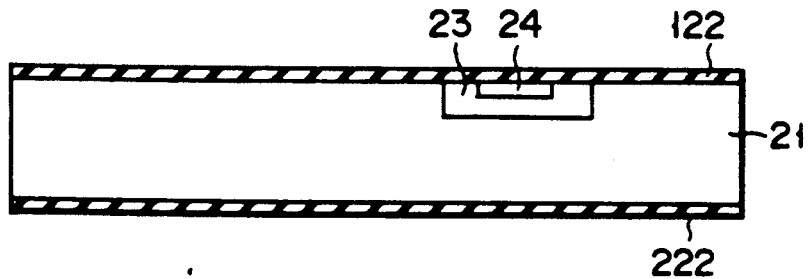
FIGS. 6A to 6D are cross-sectional views illustrating a process of making the semiconductor acceleration sensor according to the embodiment of the invention.

As is shown in FIG. 6A, a P-type silicon semiconductor substrate 21 having a thickness of 300 microns and having a (100) or (110) crystal plane is prepared. Oxide films 122 and 222 are formed on both surfaces of the semiconductor substrate 21. An N-type impurity is selectively introduced into the semiconductor substrate to provide an N-type semiconductor region 23 having a thickness of 60 to 80 microns therein. Then, a P-type impurity is introduced into the N-type semiconductor region 23, thereby forming a plurality of P-type semiconductor regions 24 serving as resistors. For example, each of the P-type semiconductor regions 24 has a depth of about 3 microns, a length of about 80 microns, and a width of about 20 microns.

Figure 6B:
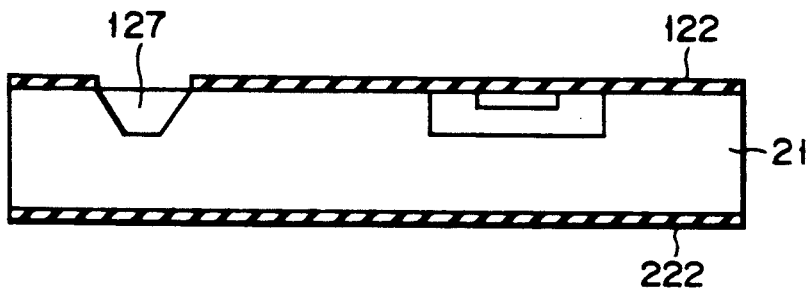

As is shown in FIG. 6B, after an opening with a predetermined size is formed in the oxide film 122, electrolytic etching with use of an electrolyte of caustic potash is carried out to form an upper funnel-shaped aperture 127 in the substrate 21. In this case, the depth of the funnel-shaped aperture 127 is set so as to be equal to the thickness of the N-type semiconductor region 23.

Figure 6C:
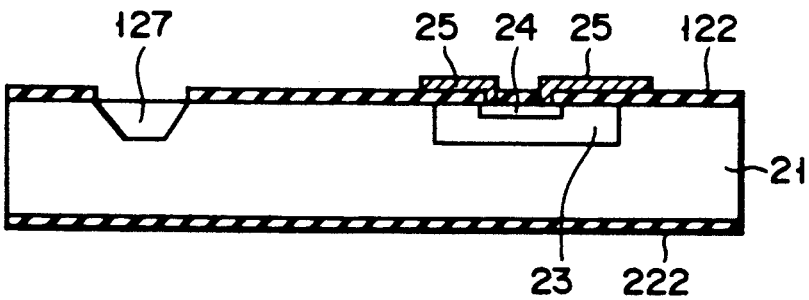

Subsequently, as is shown in FIG. 6C, the oxide film 122 on the P-type semiconductor region 24 is selectively removed to provide electrode wiring layers 25 at both end portions of the P-type semiconductor region 24.

Figure 6D:
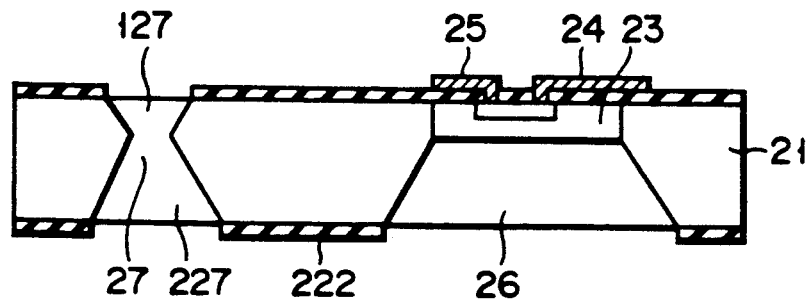

Then, as is shown in FIG. 6D, openings of predetermined sizes are made in the oxide film 222 formed on the bottom surface of the semiconductor substrate 2 at positions corresponding to the funnel shaped aperture 127 and the N-type semiconductor region 23. In the same manner as mentioned above, the exposed semiconductor substrate 21 is selectively removed by the electrolytic etching, thereby forming a lower funnel-shaped aperture 227 and a cavity 26 therein. In this case, the funnel-shaped apertures 127 and 227 are connected with each other, and a penetrating aperture 27 is formed. In addition, a diaphragm or a thin portion (corresponding to the N-type semiconductor region 23) is formed by the cavity 26. As a matter of course, in the described etching steps, the semiconductor substrate 21 is coated with an etching mask such as wax materials.

As is clear from FIG. 6D, the angle between the bottom surface of the semiconductor substrate 21 (having a length of about 6 mm) and the wall defining the aperture 227 is about 60°. The diameter of the opening of the aperture 127 is about 0.35 mm, that of the opening of the aperture 227 is about 0.5 mm, and that of the opening of the cavity 26 is about 1 mm, respectively.

Figure 1:
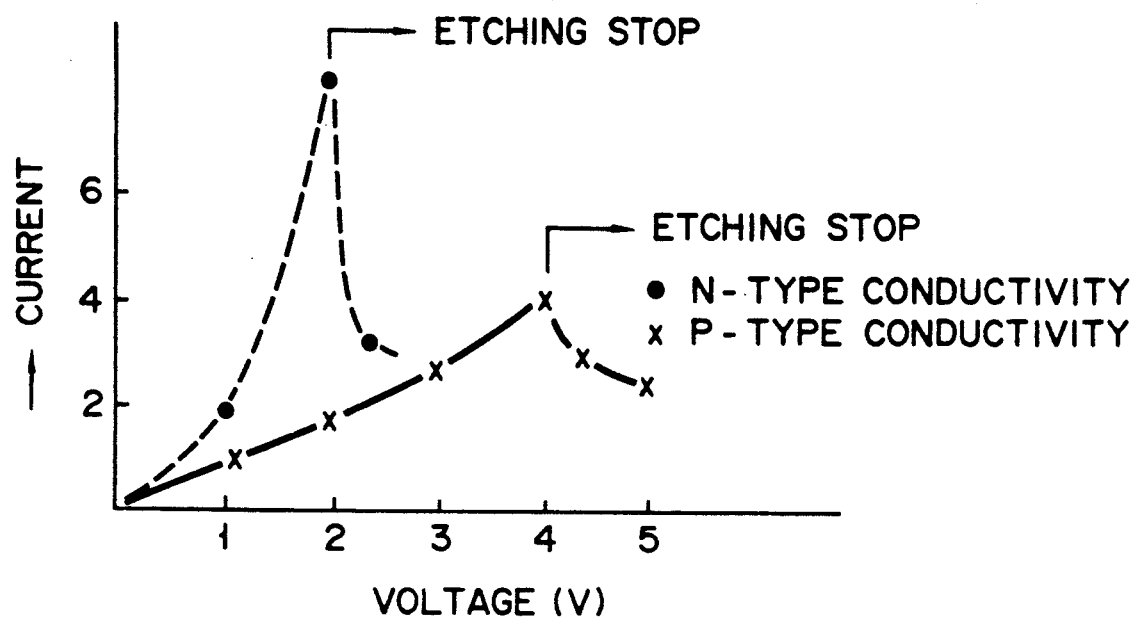
FIG. 1 is a graph showing etching characteristics obtained when a silicon semiconductor substrate is electrolytically etched, using an electrolytic etching solution of caustic potash.
Figure 2:
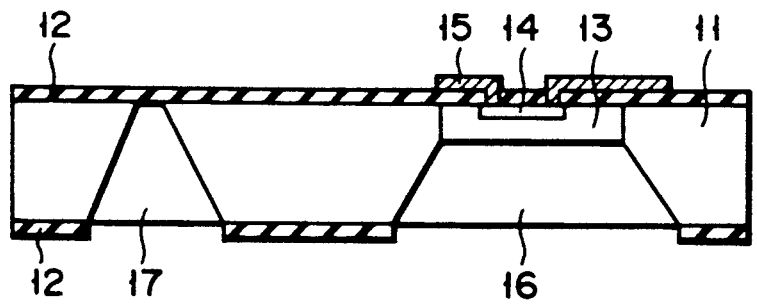
FIG. 2 is a cross-sectional view showing a conventional semiconductor acceleration sensor.
Figure 3:
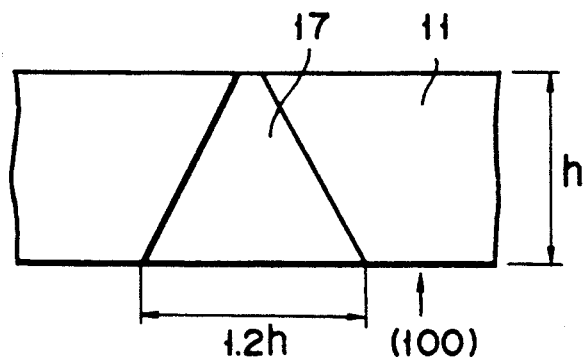
FIG. 3 is an enlarged cross-sectional view showing a funnel-shaped penetrating aperture in the conventional semiconductor acceleration sensor.
Figure 7:
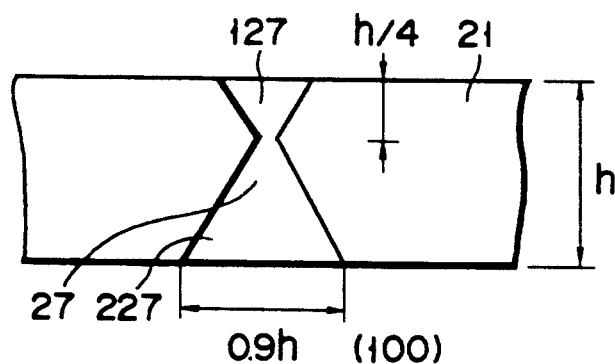
FIG. 7 is an enlarged cross-sectional view showing a funnel-shaped penetrating aperture in the semiconductor acceleration sensor according to the embodiment of the invention.

FIG. 7 is an enlarged cross-sectional view showing the penetrating aperture 27 consisting of the funnel-shaped apertures 127 and 227 shown in FIG. 6D. When the depth of the aperture 127 is given by h/4 (h: the thickness of semiconductor substrate 21), the diameter of the opening of the funnel-shaped aperture 227 becomes 0.9 h. Thus, the size of the penetrating aperture 27 can be reduced, as compared with the prior art shown in FIG. 3 wherein only the bottom surface of the substrate is etched to form the funnel-shaped aperture.

The funnel-shaped apertures 127 and 227 formed at both side portions of the diaphragm serve as buffers against mechanical and thermal shock.

Figure 8A:
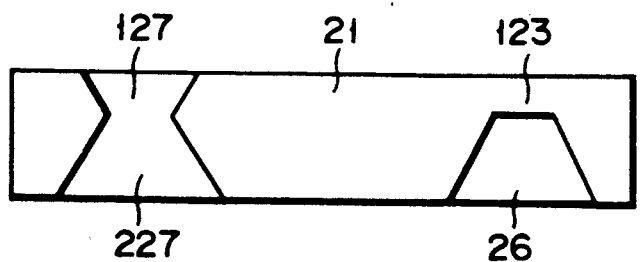
FIGS. 8A to 8C are enlarged cross-sectional views showing various types of funnel-shaped penetrating apertures in the semiconductor sensors.
Figure 8B:
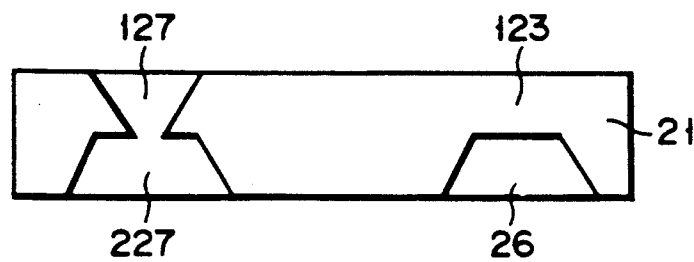
Figure 8C:
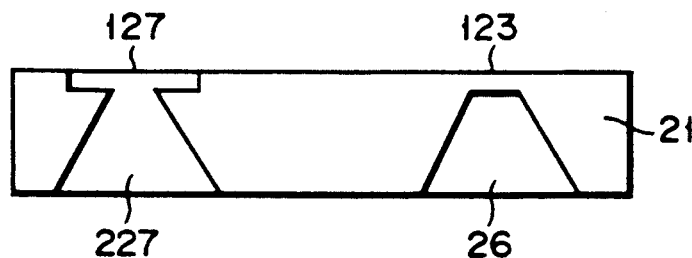

Furthermore, as is shown in FIGS. 8A to 8C, penetrating apertures provided by upper and lower funnel-shaped apertures 127 and 227 having various configurations, which are different in the diameter and depth may be formed in the semiconductor substrate, and diaphragms having the different thickness, that is, the different depth may also be provided.

As has been described above, since the penetrating aperture in the semiconductor substrate is provided by upper and lower funnel-shaped apertures which are formed from both surfaces of the substrate by means of etching, the size of the penetrating aperture can be reduced, and the lower funnel-shaped aperture and the cavity can be simultaneously formed with high precision. In addition, by changing the etching amount of the top and bottom surfaces of the substrate, the thickness of the diaphragm can be controlled. Therefore, high sensitivity semiconductor sensors with the small size can be obtained with a high yield.

It is further understood by those skilled in the art that the foregoing description is preferred embodiment of the disclosed device and the method and that various changes and modifications may be made in the invention departing from the spirit and scope thereof.

What is claimed is:

1. A semiconductor sensor comprising:
   a semiconductor substrate of a first conductivity type having upper and lower surfaces;
   a semiconductor diaphragm defined by a cavity formed in said semiconductor substrate;
   a penetrating aperture provided in said semiconductor substrate to surround desired sides of said diaphragm; and
   said aperture including a first section having a first depth and a second section having a second depth deeper than said first depth,
   wherein said first section includes a first opening portion having a first diameter in the upper surface and said second section includes a second opening portion having in the lower surface a second diameter larger than said first diameter, and said first section communicates with said second section through a common opening portion having a third diameter smaller than said first diameter.

2. The semiconductor sensor according to claim 1, wherein said cavity has a funnel-shaped structure.

3. The semiconductor sensor according to claim 1, wherein said semiconductor diaphragm is a second conductivity type opposite to said first conductivity type of said semiconductor substrate.

4. The semiconductor sensor according to claim 1, wherein said first and second sections are located such that a straight line passed through a center of each of said first, second and third diameters.

5. The semiconductor sensor according to claim 1, wherein said first section is funnel-shaped.

6. The semiconductor sensor according to claim 1, wherein said first section is square.

7. The semiconductor sensor according to claim 1, wherein said second section is funnel-shaped.

8. The semiconductor sensor according to claim 1, wherein a thickness of said semiconductor diaphragm is substantially equal to said first depth.

* * * * *

UNITED STATES PATENT AND TRADEMARK OFFICE
CERTIFICATE OF CORRECTION

PATENT NO. : 5,283,459
DATED : February 01, 1994
INVENTOR(S) : Hirokazu Hirano et al.

It is certified that error appears in the above-indentified patent and that said Letters Patent is hereby corrected as shown below:

On the title page;

In the Abstract, line 7, change "aperatures" to --apertures--.

Claim 4, column 5, line 3, change "passed" to --passess--.

Signed and Sealed this

Twenty-seventh Day of December, 1994

Attest:

BRUCE LEHMAN

*Attesting Officer*  *Commissioner of Patents and Trademarks*